United States Patent Office 3,336,386
Patented Aug. 15, 1967

3,336,386
HYDROGENATION WITH PLATINUM METAL
SULFIDE CATALYST
Frederick S. Dovell, Naugatuck, and Harold Greenfield,
Watertown, Conn., assignors to Uniroyal Inc., a corporation of New Jersey
No Drawing. Filed Mar. 12, 1963, Ser. No. 264,691
8 Claims. (Cl. 260—576)

The present invention relates to a catalyzed process for non-destructive hydrogenation reactions, such as reductive hydrogenation, hydrogenolysis and reductive alkylation, as well as to the new compounds formed with the aid of the catalysts of the process.

The platinum metal sulfides—that is, the sulfides of ruthenium, rhodium, palladium, osmium, iridium and platinum—have not heretofore been used as non-destructive hydrogenation catalysts. Destructive hydrogenation reactions proceed at elevated temperatures, most often at about 400°–550° C., at which temperatures the substrate is undergoing thermal decomposition prior to and/or concurrently with hydrogenation, as in the case of the destructive hydrogenation of coal, asphalts, and tars.

The platinum metals are the six metals (listed above) in Group VIII, Periods 5 and 6 of the Periodic Table. The *noble metals* are often considered to include gold and silver as well as the aforementioned six metals. In order to avoid confusion, the term *platinum metals* will be used throughout the specification as it is the term well recognized by those engaged in the art of catalysis as identifying the above listed six metals (Encyclopedia of Chemical Technology, vol. 10, pp. 819–59 (Interscience, 1953)).

It is an object of this invention to provide a process for catalyzing the following groups of reactions:

(A) REDUCTIVE ALKYLATIONS (1) the reductive alkylation of aryl or aliphatic primary amines (or their nitro or aryl nitro-N-nitroso-amine precursors) with aryl or aliphatic aldehydes or aliphatic or alkylaryl ketones;

(B) REDUCTIVE HYDROGENATIONS (2) the reduction of aliphatic or aryl nitro compounds to the corresponding amino compounds;
(3) the reduction of unsaturated heterocyclic rings by nuclear hydrogenation;
(4) the reduction of aryl disulfides to thiophenols;

(C) HYDROGENOLYSIS (5) the reductive cleavage (hydrogenolysis) of N-nitroso groups of aryl N-nitrosoamines.

It is a special object of this invention to provide a process which will catalyze the reductive alkylation of a primary aromatic amine with an aliphatic or alkylaryl ketone to produce a corresponding secondary alkylaryl amine, but which will not, through side reactions, cause cleavage by hydrogenolysis of carbon-nitrogen linkages, nor reductive hydrogenation of aromatic rings, ketones (to the corresponding alcohols), aryl sulfones or aryl monosulfides.

It is a further object of this invention to provide a hydrogenation process using a catalyst having a long life and a high level of activity even after long exposure to the common catalyst poison sulfur. Still another object of this invention is to provide a catalyzed process which is suitable for operation at relatively low temperatures, so as to avoid undesirable side reactions, and relatively low pressures, so as to be economically desirable.

It is yet another object of this invention to provide several new and useful compositions of matter.

This invention comprises the use of the sulfides of the platinum metals as heterogeneous hydrogenation catalysts for the reduction of a wide variety of substrates with molecular hydrogen, and the new compounds so formed. Such hydrogenations are of several types, such as the addition of hydrogen to an unsaturated linkage, as in the hydrogenation of heterocyclic rings; the cleavage of bonds by hydrogenolysis, as in the hydrogenation of a disulfide to a mercaptan; and the formation of stable products by the hydrogenation in situ of intermediates formed by prior chemical reaction, as in the reductive alkylation of primary amines with aldehydes and ketones.

The advantages of the catalysts of this invention over those previously used in the art are several. Firstly, the catalysts of this invention provide a degree of desired selectivity hitherto unattainable in certain hydrogenation reactions, such as reductive alkylations. For example, in a typical and industrially important reaction, the reductive alkylation of a primary aromatic amine with an aliphatic ketone to produce the corresponding secondary alkylaryl amine, as in the alkylation of N-phenyl-p-phenylenediamine with acetone to produce N-isopropyl-N'-phenyl-p-phenylenediamine (also known as p-isopropylamino-diphenylamine, a p-alkylamino aromatic amine), there is no catalyst previously known in the art that does not result in at least one of the following important and undesirable side reactions: hydrogenation of the aromatic ring, cleavage by hydrogenolysis of carbon-nitrogen linkages, and reduction of the ketone to the corresponding alcohol. All of these side reactions may be substantially avoided by the use of a platinum metal sulfide as the reductive alkylation catalyst. However, an excess of ketone is preferably avoided when using iridium sulfide as the catalyst since, after a quantitative or near quantitative reductive alkylation, any excess ketone may be reduced to some extent to the corresponding alcohol (see Examples 28 and 29).

Secondly, these platinum metal sulfide catalysts are insensitive even to those sulfur-containing compounds that severably inhibit most other catalysts. Thus, catalysts of this invention may be used with sulfur-containing feeds and do not require the use of purified hydrogen. Indeed, the platinum metal sulfide catalysts may be used for the hydrogenation of compounds containing one or more sulfur atoms in the molecule. Their insensitivity to sulfur insures a long life at a high level of activity, even after long exposure thereto.

By way of comparison, the poisoning of conventional hydrogenation catalysts by even small amounts of sulfur, hydrogen sulfide, or other compounds containing sulfide linkages is discussed in many references including Journal of the American Chemical Society, volume 70, page 1392 (1948); "Reactions of Hydrogen with Organic Compounds" by H. Adkins (University of Wisconsin Press, 1937), page 22; "Catalysis" by Berkman, Morrell, and Egloff (Reinhold Publishing Corp., 1940), pages 391–393. Sulfur poisoning of specific catalysts is discussed with respect to copper and Raney nickel catalysts in Industrial & Engineering Chemistry, volume 52, page 417 (1960) and volume 33, page 1373 (1941), respectively.

Thirdly, platinum metal sulfide catalysts are far more active for many hydrogenation reactions than the metal sulfide catalysts previously known in the art, and therefore are suitable for reactions that must be run at relatively low temperatures to avoid undesirable side reactions.

And fourthly, the catalysts of this invention have the economically desirable advantage of being effective at relatively low pressures.

The catalysts of the instant invention will not ordinarily cause reduction of aryl sulfones or aryl monosulfides, nor cleavage of carbon-nitrogen linkages. Because of the relative inertness of these linkages and compounds to reaction with hydrogen over platinum metal sulfides, other more easily conducted reactions may be carried out on reactants in the presence of these compounds and/or on reactants which contain these linkages. Although aryl mono-sulfides will not be reduced by the instant catalysts under normal conditions of reaction (such as the 180° C. of Example 60), at higher conditions of temperature, pressure, and catalyst concentration (such as the 290° C. of Example 61) some reduction will occur.

Furthermore, with the catalysts of this invention, the same final products are obtained whether the original reactant to undergo reductive alkylation is a primary amine (e.g., N-phenyl-p-phenylenediamine) or a primary amine precursor, such as either a nitro compound (e.g., p-nitrodiphenylamine, which is reduced to the aforementioned primary amine in situ) or an aryl nitro-N-nitrosoamine (e.g., N-nitroso-p-nitrodiphenylamine, which is reduced to the aforementioned primary amine in situ).

The techniques and disadvantages of conventional preparations of alkylaryl secondary amines by the reductive alkylation of a primary aromatic amine with aliphatic ketones are discussed in "Copper Chromite Catalysts for Reductive Alkylation," I & EC Product Research and Development, volume 1, pages 179–181 (September 1962), and the references cited therein. It is significant that, whereas our yield of N-isopropyl-N'-phenyl-p-phenylenediamine from the reductive alkylation of N-phenyl-p-phenylenediamine with acetone, using our preferred catalysts, is quantitative (Examples 30 and 31) even without an excess of ketone, the highest yield recorded in the cited reference is 93% (Table V). The aforementioned selectivity and activity under desirable conditions of operation are also distinct advantages of the catalysts of this invention.

The platinum metal sulfide catalysts can be prepared by reaction of appropriate compounds of the metals (e.g., $OsO_4$, $IrCl_3$) with solutions of alkali, alkaline earth or ammonium sulfides, hydrosulfides or polysulfides; by treatment of solutions of appropriate compounds of the metals (e.g., $H_2PtCl_6 \cdot H_2O$, $PdCl_2 \cdot 2H_2O$) in dilute acids with hydrogen sulfide; by reaction of the metal itself with hydrogen sulfide, other sulfur-containing compounds or elemental sulfur; and by other methods obvious to those skilled in the art of catalyst preparation. The catalyst may be prepared in situ or pre-formed, i.e., added to the hydrogenation reaction mixture after prior preparation and isolation. Further, the catalyst may be prepared and used as a bulk powder or supported on a suitable carrier, such as carbon or alumina; and, whether supported or not, may be prepared and used as a powder for liquid phase slurry and for vapor phase fluidized reactions, or as a pellet for liquid or vapor phase fixed bed operations.

The catalyzed hydrogenation reactions may be run at temperatures ranging from about 50° C. to 100° C. or other temperatures as high as the stability of the reactants will permit and at pressures ranging from about 75 p.s.i.g. to 150 p.s.i.g. or even to several thousand p.s.i.g. The exact conditions of operation will depend, of course, on the nature of the hydrogenation reaction being carried out as well as on the optimum economic combination of temperature, pressure, catalyst level and cycle time. The range of practical catalyst levels is illustrated by the examples given below. As determined by extrapolation from the examples, quantitative or almost quantitative reactions may often be achieved with as low a weight ratio of catalyst (bulk or supported) to reactant to be hydrogenated as 0.001.

On the basis of a weighted combination of catalyst cost and catalytic activity, the preferred catalysts of the platinum metal sulfide group are rhodium sulfide and platinum sulfide.

The reactions may be carried out in either batch or continuous systems with either tank or pipe-line type reactors, and in the liquid phase with slurry or fixed bed catalysts or in the vapor phase with either fluidized or fixed bed catalysts, according to procedures well known to those skilled in the art.

Several new compounds are produced by using the process of the instant invention. The new composition of matter, N - 3-(5-methylheptyl)-N'-phenyl-p-phenylenediamine, produced in Example 43, is an effective rubber antiozonant, as is demonstrated in the tests of Example 64. The process of the instant invention is further useful in the production of a new class of compounds, the N,N'-dialkyl-1,5-diaminonaphthalenes. N,N'-diisopropyl-1,5-diaminonaphthalene is produced in Example 44 and other members of this class, N,N'-dicyclohexyl-1,5-diaminonaphthalene, N,N' - di-sec-butyl-1,5-diaminonaphthalene, and N,N'-di-1,3-dimethylbutyl-1,5-diaminonaphthalene, are produced in Examples 45–47. Each member of the class demonstrates a highly desirable level of activity as a stabilizer and anti-cracking agent for rubber. The appearance and melting point ranges of the new compositions of matter listed above are recorded in the cited preparation examples.

Details (such as temperatures, reaction rates, reactants, etc.) for the various conventional alkylations mentioned above and in the examples below are cited in "Preparation of Amines by Reductive Alkylation," Chapter 3 of volume 4 (written by Emerson) of the Organic Reactions series. (Wiley & Sons, N.Y.C.).

It is to be expressly understood that the term "reductive alkylation" is herein used in its broader sense and encompasses the linkage of aliphatic (non-aromatic) as well as aromatic (aryl) groups through the carbonyl group to the amine (in accord with the terminology of Emerson, supra). The carbonyl-containing compound may be an aliphatic or aromatic aldehyde or an aliphatic or alkylaryl ketone.

The following examples are presented to bring out with particularity the scope and utility of the invention. The term "topping" is common in the art and is used to describe the removal of a low boiling component (distillate) by distilling a mixture to a given temperature at a given pressure to obtain a higher boiling residue. The stainless steel Magne-Dash autoclave used in the examples is a commercially available reaction pot equipped with temperature and pressure controls.

SUMMARY OF EXAMPLES (A) Examples 1–5 illustrate the laboratory preparation of bulk, non-supported sulfides of palladium, rhodium, platinum, iridium and osmium, respectively. They are utilized in later examples and are not novel in themselves. Ruthenium sulfide may be similarly prepared.

(B) Examples 6–13 illustrate the reduction of an aryl nitro compound to the corresponding aryl amine, viz, nitrobenzene to aniline. The following catalysts were used: Example 6, rhodium sulfide-on-carbon formed in situ from rhodium-on-carbon and hydrogen sulfide; Example 7, rhodium sulfide-on-carbon formed in situ from rhodium-on-carbon and sulfur; Example 8, bulk rhodium sulfide prepared as in Example 2; Example 9, bulk platinum sulfide prepared as in Example 3; Example and carbon disulfide; Example 10, bulk palladium sulfide prepared as in Example 1; Example 11, bulk iridium sulfide prepared as in Example 4; Example 12, bulk osmium sulfide prepared as in Example 5; Example 13, bulk ruthenium sulfide formed in situ from ruthenium oxide and hydrogen sulfide.

(C) Example 14 illustrates the selective reduction of a nitro group to an amino group in the presence of a sulfide linkage, viz, reduction of 4,4'-dinitro-diphenyl sulfide to 4,4'-diamino-diphenyl sulfide, using a rhodium sulfide-on-carbon catalyst. It also illustrates the resistance of metal sulfide catalysts to sulfur-poisoning.

(D) Example 15 illustrates the reductive alkylation of an aryl amine with an aliphatic aldehyde, viz, aniline and butyraldehyde, using a rhodium sulfide-on-carbon catalyst formed in situ.

(E) Example 16 illustrates the reductive alkylation of an aryl amine with an alkylaryl ketone, viz, aniline and acetophenone, using a rhodium sulfide-on-carbon catalyst formed in situ.

(F) Examples 17–29 illustrate the reductive alkylation of an aryl amine with an aliphatic ketone, viz, aniline and acetone, using the following catalysts: Example 17, bulk palladium sulfide prepared as in Example 1; Example 18, palladium sulfide-on-carbon formed in situ; Example 19, bulk platinum sulfide prepared as in Example 3; Example 20, platinum sulfide-on-carbon formed in situ; Examples 21–22, bulk platinum sulfide formed in situ; Example 23, bulk rhodium sulfide prepared as in Example 2; Examples 24–25, rhodium sulfide-on-carbon formed in situ; Example 26, ruthenium sulfide-on-carbon formed in situ; Example 27, bulk ruthenium sulfide formed in situ; Example 28, bulk iridium sulfide prepared as in Example 4; Example 29, bulk osmium sulfide prepared as in Example 5.

(G) Examples 30–43 illustrate the reductive alkylation of an aryl amine, N-phenyl-p-phenylenediamine, with different aliphatic ketones; Examples 30–31 use acetone and rhodium sulfide-on-carbon formed in situ; Example 32 uses acetone and osmium sulfide; Example 33 uses methyl ethyl ketone and platinum sulfide-on-carbon. Examples 34–42 use methyl isobutyl ketone and the following catalysts: Example 34, rhodium sulfide-on-carbon formed in situ; Examples 35–36, platinum sulfide-on-carbon; Examples 37–39, rhodium sulfide-on-carbon; Example 40, ruthenium sulfide-on-carbon; Example 41, rhodium sulfide-on-carbon at very low pressure; Example 42, rhodium sulfide-on-carbon in a pilot plant scale experiment. Example 43 uses 5-methylheptanone-3 and rhodium sulfide-on-carbon.

(H) Examples 44–47 illustrate the reductive alkylation of an aromatic diamine, 1,5-diaminonaphthalene, with aliphatic ketones, using rhodium sulfide-on-carbon formed in situ. Example 44 illustrates the preparation of N,N'-diisopropyl-1,5-diaminonaphthalene, and Examples 45–47 illustrate the preparation of other specific N,N'-dialkyl-1,5-diaminonaphthalenes, using rhodium sulfide-on-carbon.

(I) Example 48 illustrates the reductive alkylation of an aliphatic amine, cyclohexylamine, with an aliphatic ketone, cyclohexanone, using platinum sulfide-on-carbon.

(J) Example 49 illustrates the reductive alkylation of an aryl amine, aniline, with an aryl aldehyde, benzaldehyde, using rhodium sulfide-on-carbon.

(K) Examples 50–51 illustrate the reductive alkylation of aryl nitro compounds with an aliphatic ketone, acetone, using rhodium sulfide-on-carbon formed in situ. Example 50 uses nitrobenzene; Example 51 uses p-nitrodiphenylamine.

(L) Examples 52–53 illustrate the reductive alkylation of a mononitro monoamino aryl compound, viz., p-nitroaniline, with an aliphatic ketone, methyl ethyl ketone, using rhodium sulfide-on-carbon formed in situ (Example 53) and preformed (Example 54).

(M) Example 54 illustrates the reductive cleavage (hydrogenolysis) of the N-nitroso group in N-nitroso-p-nitrodiphenylamine, and the reductive alkylation of the nitro group, using an aliphatic ketone, acetone, for the reductive alkylation, and bulk platinum sulfide formed in situ from platinum oxide and hydrogen sulfide.

(N) Example 55 illustrates the reductive alkylation of an aliphatic nitro compound, 2-nitropropane, with an aliphatic ketone, acetone, using rhodium sulfide-on-carbon. This also illustrates—by necessary implication—the reduction of the aliphatic nitro compound to the aliphatic amino compound.

(O) Example 56 illustrates the reductive cleavage of an aryl N-nitrosoamine to the corresponding aryl amine, viz. N-nitrosodiphenylamine to diphenylamine, using rhodium sulfide-on-carbon formed in situ from rhodium-on-carbon and sulfur.

(P) Example 57 illustrates the nuclear hydrogenation of a heterocyclic ring, using pyridine and rhodium sulfide-on-carbon formed in situ.

(Q) Example 58 illustrates the reduction of an aryl disulfide, phenyl disulfide, to the thiophenol, using rhodium sulfide-on-carbon.

(R) Examples 59–60 illustrate the activity of rhodium sulfide for the reduction of aryl monosulfides, such as phenyl sulfide, as a function of temperature, pressure, and catalyst concentration. This makes possible the selectivity illustrated by Example 14.

(S) Example 61 illustrates the lack of activtiy of rhodium sulfide for reduction of an aryl sulfone.

(T) Example 62 illustrates the utility of the N,N'-dialkyl-1,5-diaminonaphthalenes of Examples 44–47 as stabilizers and anti-cracking agents for rubber.

(U) Example 63 illustrates the utility of the N-3-(5-methylheptyl)-N'-phenyl-p-phenylenediamine of Example 43 as an antiozonant for rubber.

EXAMPLES

*Example 1.*—Ten grams of palladium chloride $$(PdCl_2.2H_2O)$$

were added to sufficient 0.3 N hydrochloric acid for substantial solution of the Pd compound, hydrogen sulfide gas being bubbled therethrough until complete precipitation of the black palladium sulfide was effected. The slurry was filtered, the sulfide precipitate washed with distilled water, and finally the water displaced by washing with isopropanol. The catalyst was stored as an isopropanol paste containing 42% solids.

*Example 2.*—Seven grams of rhodium chloride $$(RhCl_3.xH_2O, 40\% \ Rh)$$

were dissolved in 133 ml. of distilled water. Hydrogen sulfide gas was passed through the solution until precipitation of the black sulfide was complete. The slurry was filtered, the solid washed with water and then air-dried, giving 5.6 grams of rhodium sulfide, probably $$Rh(HS)_3.xH_2O$$

*Example 3.*—Ten grams of chloroplatinic acid $$(H_2PtCl_6.xH_2O, 40\% \ Pt)$$

were dissolved in 150 ml. of distilled water. Hydrogen sulfide gas was passed through the solution until precipitation of the black sulfide was complete. The slurry was filtered, the solid washed with water and then air-dried, giving 5.2 grams of platinum sulfide, probably $PtS_2$.

*Example 4.*—Seven grams of iridium chloride ($IrCl_3$, 50.55% Ir) were dissolved in a mixture of 30 ml. distilled water and 20 ml. concentrated ammonium hydroxide. Hydrogen sulfide gas was passed through the solution until no further precipitation of a yellow-brown solid took place. Additional material precipitated when 6 N hydrochloric acid was added until pH 3 was attained. The slurry was filtered, the solid washed with water and then air-dried, giving 3.0 grams of iridium sulfide, probably $Ir_2S_3$.

*Example 5.*—Ten grams of osmium tetroxide ($OsO_4$) were dissolved in 200 ml. of 3 N sodium hydroxide. This solution was added slowly with stirring to a solution of 25 grams of sodium sulfide ($Na_2S \cdot 9H_2O$) in 50 ml. of water. The slurry was filtered, the solid washed with water and then air-dried, giving 14.8 grams of osmium sulfide.

*Example 6.*—A mixture of 24.6 grams (0.20 mole) of nitrobenzene, 210 ml. of isopropanol and 2.5 grams of 5% rhodium-on-carbon was added to a 600 ml. stainless steel Magne-Dash autoclave. The autoclave was sealed and purged with nitrogen and then with hydrogen. Hydrogen sulfide was added to a pressure of 50 p.s.i.g., followed by the addition of hydrogen to a pressure of 1300 p.s.i.g. The reaction mixture was heated with agitation at 180° C. and 1400–1600 p.s.i.g. for 0.6 hr., at the end of which time the absorption of gas stopped abruptly at 100% of theory. The autoclave was cooled and depressurized and the reaction product removed. After removal of the catalyst by filtration and removal of the water and solvent by distillation, there was obtained a liquid residue product in better than 95% yield that was identified and analyzed by vapor phase chromatography as pure aniline.

*Example 7.*—Example 6 was repeated with 3.2 grams (0.10 mole) of sulfur instead of hydrogen sulfide as the sulfiding agent. After 0.5 hr. at 180° C. and 1400–1600 p.s.i.g. and treatment in a manner similar to that in Example 6, there was obtained aniline as a residue product of 99% purity (as determined by vapor phase chromatographic analysis).

*Example 8.*—A mixture of 24.6 grams (0.20 mole) of nitrobenzene, 210 ml. of toluene and 2.5 grams of rhodium sulfide, prepared as in Example 2, was added to a 600 ml. stainless steel Magne-Dash autoclave. The autoclave was sealed and purged with nitrogen and then with hydrogen. Hydrogen then was added to a pressure of 1300 p.s.i.g. The reaction mixture was heated with agitation for 0.6 hr. at 140° C. and 1200–1400 p.s.i.g., at which time gas absorption stopped abruptly. The autoclave was cooled and depressurized and the reaction product removed. After removal of the catalyst by filtration, the reaction mixture was topped to a pot temperature of 180° C., at atmospheric pressure. The liquid residue product was identified and analyzed by vapor phase chromatography as aniline of about 99.5% purity.

*Example 9.*—A mixture of 24.6 grams (0.20 mole) of nitrobenzene, 205 ml. of isopropanol, 7.6 grams (0.10 mole) of carbon disulfide and 2.5 grams of platinum oxide was added to a 600 ml. stainless steel Magne-Dash autoclave. The vessel was sealed, purged, and hydrogen added to a pressure of 1300 p.s.i.g. as in Example 8. The reaction mixture was heated with agitation for 0.5 hr. at 140° C. and 1200–1400 p.s.i.g., at the end of which time gas absorption stopped abruptly. Treatment as in Example 8 resulted in a liquid residue product containing 93% aniline (as determined in accordance with the procedure of Example 8).

*Example 10.*—A mixture of 24.6 grams (0.20 mole) of nitrobenzene, 210 ml. of isopropanol and 2.5 grams (on a dry basis) of palladium sulfide prepared as in Example 1, was added to a 600-ml. stainless steel Magne-Dash autoclave. The vessel was sealed, purged, and hydrogen added to a pressure of 1300 p.s.i.g. as in Example 8. The reaction mixture was heated with agitation for about 0.5 hr. at 170–180° C. and 1300–1500 p.s.i.g., when gas absorption stopped. An additional hour at 180° C. produced no further gas absorption. Treatment as in Example 8 resulted in a liquid residue product containing 89% aniline (as determined in accordance with the procedure of Example 8).

*Example 11.*—A mixture of 24.6 grams (0.20 mole) of nitrobenzene, 210 ml. of isopropanol and 2.5 grams of iridium sulfide, prepared as in Example 4, was added to a 600 ml. stainless steel Magne-Dash autoclave. The vessel was sealed, purged and hydrogen added to a pressure of 1300 p.s.i.g. as in Example 8. The reaction mixture was heated with agitation for two hours at 180° C. and 1400–1600 p.s.i.g., at the end of which time gas was being absorbed very slowly. Treatment as in Example 8 resulted in a liquid residue product containing 86% aniline and 3% nitrobenzene (as determined in accordance with the procedure of Example 8).

*Example 12.*—A mixture of 24.6 grams (0.20 mole) of nitrobenzene, 210 ml. of isopropanol and 2.5 grams of osmium sulfide, prepared as in Example 5, was added to a 600-ml. stainless steel Magne-Dash autoclave. The vessel was sealed, purged and hydrogen added to a pressure of 1300 p.s.i.g. as in Example 8. The reaction mixture was heated with agitation for 0.2 hr. at about 140° C. and 1200–1400 p.s.i.g., at the end of which time gas absorption stopped abruptly. Treatment as in Example 8 resulted in a liquid residue product containing 95% aniline (as determined in accordance with the procedure of Example 8).

*Example 13.*—A mixture of 24.6 grams (0.20 mole) of nitrobenzene, 210 ml. of isopropanol and 2.5 grams of ruthenium oxide was added to a 600-ml. stainless steel Magne-Dash autoclave. The vessel was sealed and purged, and hydrogen sulfide and hydrogen were added as in Example 6. The reaction mixture was heated with agitation for one hr. at 140° C. and 1200–1400 p.s.i.g., at the end of which time gas absorption stopped abruptly. Treatment as in Example 8 resulted in a liquid residue product containing 76% aniline (as determined in accordance with the procedure of Example 8).

*Example 14.*—To a 600-ml. stainless steel Magne-Dash autoclave were added 27.6 grams (0.10 mole) of crude 4,4'-dinitrodiphenyl sulfide (from the reaction of p-nitrochlorobenzene and sodium sulfide, melting at about 135°–155° C.), 205 ml. of xylene and 2.5 grams of a 5% rhodium sulfide-on-carbon catalyst. The autoclave was sealed, purged with nitrogen, then with hydrogen, and hydrogen added to a pressure of 1300 p.s.i.g. The pressure reached a maximum of 1540 p.s.i.g. and then was kept at 1200–1400 p.s.i.g. at 140° C. for six hrs., after which time gas absorption stopped completely. The autoclave was cooled and depressurized and the reaction product removed. Dioxane was added to facilitate solution, the catalyst removed by filtration, and the solvents removed by distillation up to a pot temperature of 150° C. at about 30 mm. pressure. The residue (principally 4,4'-diaminodiphenyl sulfide) weighed 17.3 grams and melted at 75–95° C. Washing of the residue with hot hexane raised the melting point to 100°–106° C.; recrystallization from benzene further raised the melting point to 107°–108° C.; literature value for melting point of 4,4'-diaminodiphenyl sulfide is 108°–109° C.

*Example 15.*—A 600-ml. stainless steel Magne-Dash autoclave was charged with 18.6 grams (0.20 mole) of aniline, 57.6 grams (0.80 mole) of butyraldehyde, 150 ml. of toluene, and 2.5 grams of 5% rhodium-on-carbon. The autoclave was sealed, purged with nitrogen and then with hydrogen. Hydrogen sulfide was admitted to a pressure of 50 p.s.i.g., followed by the addition of hydrogen to a pressure of 1300 p.s.i.g. The reaction mixture was heated with agitation at 140° C. and 1470–1350 p.s.i.g. for 2 hrs., at which time the hydrogen absorption was about 112% of theory for monoalkylation or 56% for dialkylation. The autoclave was cooled and depressurized and the reaction product removed. The reaction mixture was filtered to remove catalyst, the filtrate separated into several fractions by distillation, and the fractions analyzed by vapor phase chromatography. There was obtained a 12% yield of N-n-butylaniline and a 36% yield of N,N-di-n-butylaniline (42% of the aniline charged was recovered unchanged).

*Example 16.*—A 600-ml. stainless steel Magne-Dash autoclave was charged with 37.2 grams (0.40 mole) aniline, 48.0 grams (0.40 mole) acetophenone, 150 ml. toluene and 2.5 grams of 5% rhodium-on-carbon. The autoclave was sealed, purged with nitrogen and then with hydrogen. Hydrogen sulfide was admitted to a pressure of 50 p.s.i.g., followed by the addition of hydrogen to a pressure of 1300 p.s.i.g. The reaction mixture was heated with agitation at 180° C. and 1200–1400 p.s.i.g.

for 3.5 hrs., at the end of which time about 180% of the theoretical amount of hydrogen had been absorbed. The autoclave was cooled and depressurized and the reaction product removed. The reaction mixture was filtered to remove catalyst. The filtrate was distilled into several fractions which were analyzed by vapor phase chromoatography. There were obtained 23 grams of aniline (62% yield recovered unchanged), and 14.2 grams (18% yield) of N - phenyl-alpha - methylbenzylamine, boiling point 155°–157° C. at 7 mm. pressure; identified as its hydrochloride salt, melting point 183.5°–185° C. (literature value, 184°–185° C.).

*Example 17.*—To a 600-ml. stainless steel Magne-Dash autoclave were added 69.8 grams (0.75 mole) aniline, 131 grams (2.25 moles) acetone, and 2.5 grams (on a dry basis) of the palladium sulfide produced in Example 1. The autoclave was sealed, purged with nitrogen, then with hydrogen, and hydrogen added to a pressure of 1300 p.s.i.g. The reaction mixture was heated with agitation at 140° C. and 1200–1400 p.s.i.g. for 5.2 hrs. The autoclave was cooled and depressurized, and the reaction product removed. After removal of the catalyst by filtration, and of the solvent and water by distillation, a residue was obtained that was analyzed by vapor phase chromatography and consisted of 94 wt. percent N-isopropylaniline, 5 wt. percent aniline and 1% unidentified material.

*Example 18.*—To a 600-ml. stainless steel Magne-Dash autoclave were added 69.8 grams (0.75 mole) aniline, 131 grams (2.25 moles) acetone, and 10.0 grams of a 5% palladium-on-carbon catalyst. The autoclave was sealed, purged first with nitrogen, then with hydrogen. Hydrogen sulfide was added to a pressure of 50 p.s.i.g., followed by the addition of hydrogen to a pressure of 1300 p.s.i.g. The reaction mixture was heated with agitation at 185° C. and 1400–1600 p.s.i.g. for 4.2 hrs. After the reaction product was treated as in Example 17, there were obtained 88 grams of the residue product containing 92 wt. percent N-isopropylaniline, 6 wt. percent aniline and 2% of an unidentified material (as determined by vapor phase chromatography).

*Example 19.*—Example 17 was repeated with 2.5 grams (on a dry basis) of the platinum sulfide produced in Example 3. After 0.75 hr. at 180° C. and 1200–1300 p.s.i.g., there was obtained a residue product containing more than 99 wt. percent N-isopropylaniline.

*Example 20.*—Using 10.0 grams of 5% platinum-on-carbon instead of palladium-on-carbon, the autoclave was charged, sealed, purged and pressured with hydrogen sulfide and hydrogen as in Example 18. After 5.5 hrs. at 185° C. and 1200–1400 p.s.i.g., followed by treatment as in Example 17, there was obtained a residue product containing 96 wt. percent N-isopropylaniline, no aniline, and 4% of unidentified material (as determined by vapor phase chromatography).

*Example 21.*—Example 20 was repeated using 10.0 grams of platinum dioxide instead of the platinum-on-carbon. After 0.5 hr. at 110°–115° C. and 1200–1400 p.s.i.g., there was obtained a residue product containing 99 wt. percent N-isoproylaniline and 1 wt. percent aniline.

*Example 22.*—Example 21 was repeated with 2.5 grams of platinum dioxide for 3.5 hrs. at 110° C. and 1200–1400 p.s.i.g., there being obtained a residue product containing 99 wt. percent N-isopropylaniline and traces of unidentified material.

*Example 23.*—Example 17 was repeated with 2.5 grams (on a dry basis) of the rhodium sulfide produced in Example 2. After 1.5 hrs. at 120° C. and 1200–1400 p.s.i.g., there was obtained a residue product containing more than 99 wt. percent N-isopropylaniline.

*Example 24.*—Example 18 was repeated with 10.0 grams of 5% rhodium-on-carbon for 0.7 hr. at 140° C. and 1200–1400 p.s.i.g., there being obtained a residue product containing 100% N-isopropylaniline.

*Example 25.*—Example 24 was repeated with 2.5 grams of 5% rhodium-on-carbon for 2.7 hrs. at 140° C. and 1200–1400 p.s.i.g., there being obtained a residue product containing 100% N-isopropylaniline.

*Example 26.*—Example 18 was repeated with 10.0 grams of 5% ruthenium-on-carbon for 2.75 hrs. at 140° C. and 1200–1400 p.s.i.g., there being obtained a residue product containing 94 wt. percent N-isopropylaniline, less than 1 wt. percent aniline and about 6% of unidentified material.

*Example 27.*—Example 26 was repeated with 10.0 grams of ruthenium oxide for 0.5 hr. at 140°–150° C. and 1200–1400 p.s.i.g., there being obtained a residue product containing 99 wt. percent N-isopropylaniline and 1 wt. percent of aniline.

*Example 28.*—Example 17 was repeated with 2.5 grams (on a dry basis) of the iridium sulfide produced in Example 4. After 2 hrs. at 180° C. and 1400–1600 p.s.i.g., there was obtained a residue product containing 98 wt. percent N-isopropylaniline and 2% of unidentified material. Excess gas absorption indicated the presence of a side reaction, probably the reduction of some of the excess ketone, acetone, to alcohol, isopropanol.

*Example 29.*—A mixture of 18.2 grams (0.20 mole) of aniline, 182 grams (3.13 moles) of acetone and 2.5 grams of osmium sulfide, prepared as in Example 5, was charged to a 600-ml. stainless steel Magne-Dash autoclave. The autoclave was sealed and purged with nitrogen and then with hydrogen. Hydrogen was admitted to 450 p.s.i.g. The reaction mixture was heated to 80° C. with agitation and held at 400–600 p.s.i.g. for 6.25 hrs., by which time the absorption of hydrogen amounted to 0.86 mole. The autoclave was cooled and depressurized and the reaction product removed. After filtration to remove catalyst, the reaction mixture was topped to a pot temperature of 180° C. at atmospheric pressure. Vapor phase chromatographic analysis of the distillate showed the formation of 40 grams (0.67 mole) isopropanol from the acetone. Vapor phase chromatographic analysis of the residue product indicated that is was substantially pure N-isopropylaniline (100% yield).

*Example 30.*—To a 600-ml. stainless steel Magne-Dash autoclave were added 73.6 grams (0.40 mole) N-phenyl-p-phenylenediamine, 125 grams (2.18 moles) acetone and 2.5 grams of 5% rhodium-on-carbon. The autoclave was sealed, purged with nitrogen, then with hydrogen. Hydrogen sulfide was added to a pressure of 50 p.s.i.g., followed by the addition of hydrogen to a pressure of 1300 p.s.i.g. The reaction mixture was heated with agitation at 140° C. and 1200–1400 p.s.i.g. for 0.8 hr. The autoclave was cooled and depressurized, and the reaction product removed. After removal of the catalyst by filtration, the reaction mixture was topped to a pot temperature of 200° C. at reduced pressure. The residue consisted of 91 grams (100% yield) of N-isopropyl-N'-phenyl-p-phenylenediamine, identified by its melting point 70°–78° C. (mostly 75°–78° C.) and infrared spectrum.

*Example 31.*—Example 30 was repeated with an initial pressure of 500 p.s.i.g. at room temperature, and the reaction mixture was heated at 180° C. and 400–600 p.s.i.g. for 0.7 hr., with little or no gas absorption in the last 0.2 hr. After removal of the catalyst by filtration and topping the filtrate to a pot temperature of 210° C. at 25 mm. pressure, there was obtained a quantitative yield of a residue product, identified as N-isopropyl-N'-phenyl-p-phenylenediamine by its infrared spectrum, and melting at 68°–78° C. (mostly 73°–78° C.).

*Example 32.*—To a 170-ml. stainless steel Magne-Dash autoclave were charged 46.0 grams (0.25 mole) of N-phenyl-p-phenylenediamine, 16.0 grams (0.275 mole) of acetone and 0.92 gram of osmium sulfide prepared as in Example 5. The autoclave was sealed, purged with nitrogen and then with hydrogen, and hydrogen was admitted to a pressure of 400 p.s.i.g. The autoclave was agitated and heated to 180° C. After 0.75 hr. at this temperature and 400–600 p.s.i.g., absorption of hydrogen ceased abruptly at about 106% of theory. The autoclave was cooled and depressurized; the reaction mixture was removed, filtered to remove catalyst and topped to 165° C. at 30 mm. pressure. The residue product, 54 grams (96% yield), melting at 74°–77° C., was found by infrared analysis to be N-isopropyl-N'-phenyl-p-phenylenediamine.

*Example 33.*—To a 600-ml. stainless steel Magne-Dash autoclave were added 73.6 grams (0.40 mole) N-phenyl-p-phenylenediamine, 128.5 grams (1.785 moles) methyl ethyl ketone and 2.5 grams of 5% platinum sulfide-on-carbon. The autoclave was sealed, purged with nitrogen and then with hydrogen, and hydrogen added to a pressure of 1300 p.s.i.g. The reaction mixture was heated with agitation. The pressure reached a maximum of 1560 p.s.i.g. at 150° C., and in 0.2 hr. fell to 1250 p.s.i.g. at 180° C., at which time gas absorption stopped abruptly at about 100% of theory. After maintaining the temperature at 180° C. for another 0.2 hr., the autoclave was cooled, depressurized, and the reaction product removed. After removal of the catalyst by filtration, the reaction mixture was topped to a pot temperature of 180° C. at 30 mm. pressure. The residue weighed 94 grams (98% yield), melted at 47°–49.5° C., and was identified by vapor phase chromatographic analysis as N-sec-butyl-N'-phenyl-p-phenylenediamine. Distillation at 190°–193° C. at 2 mm. pressure, followed by recrystallization from hexane, afforded a white, crystalline solid, M.P. 49°–50° C.; literature value, 49°–50° C.

*Example 34.*—To a 600-ml. stainless steel Magne-Dash autoclave were added 73.6 grams (0.40 mole) N-phenyl-p-phenylenediamine, 129 grams (1.29 moles) methyl isobutyl ketone and 2.5 grams of 5% rhodium-on-carbon. The autoclave was sealed, purged with nitrogen, and then with hydrogen. Hydrogen sulfide was added to a pressure of 50 p.s.i.g., followed by the addition of hydrogen to a pressure of 500 p.s.i.g. The reaction mixture was heated with agitation at 180° C. and 400–600 p.s.i.g. for 1.25 hrs. The autoclave was cooled and depressurized and the reaction product removed The reaction mixture was filtered to remove catalyst and the filtrate topped to a pot temperature of 200° C. at 25 mm. pressure. The liquid residue, N - (1,3 - dimethylbutyl)-N'-phenyl-p-phenylenediamine, weighed 106 grams (99% yield) and had a purity of 98% by vapor phase chromatographic analysis.

The monohydrochloride salt melted at 202°–205° C. with slight decomposition. *Analysis.*—Calcd. for

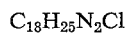

C, 70.91; H, 8.27; N, 9.19; Cl, 11.63. Found: C, 70.73; H, 8.07; N, 9.10; Cl, 11.46.

*Example 35.*—To a 170-ml. stainless steel Magne-Dash autoclave were added 21.4 grams (0.116 mole) N-phenyl-p-phenylenediamine, 34.9 grams (0.349 mole) methyl isobutyl ketone and 0.325 gram of 5% platinum sulfide-on-carbon. The autoclave was sealed, purged with nitrogen and then with hydrogen, and hydrogen added to a pressure of 400 p.s.i.g. The reaction mixture was heated with agitation at 180°–185° C. and 400–600 p.s.i.g. for 0.75 hr., after which time gas absorption stopped abruptly at about 99% of theory. The autoclave was cooled and depressurized and the reaction product removed. The reaction mixture was filtered to remove catalyst and the filtrate topped to a pot temperature of 190° C. at 24 mm. pressure. The liquid residue of N-(1,3-dimethylbutyl)-N'-phenyl-p-phenylenediamine weighed 31.4 grams (100% yield) and was shown by infrared and vapor phase chromatographic analyses to be of over 99% purity.

*Example 36.*—Example 35 was repeated at a pressure of 200–300 p.s.i.g. at reaction temperature. Gas absorption stopped at 102% of theory after 1 hr. at 180°–185° C. Treatment as in Example 35 resulted in 31.3 grams (100% yield) of a residue product that was practically pure N - (1,3-dimethylbutyl)-N'-phenyl-p-phenylenediamine (as determined by analyses as in Example 35).

*Example 37.*—Example 35 was repeated using 0.325 gram of 5% rhodium sulfide-on-carbon. Similar results were obtained after 0.4 hr. at 180°–185° C. and 400–600 p.s.i.g.

*Example 38.*—Example 35 was repeated with 0.813 gram of 2% rhodium sulfide-on-carbon. Similar results were obtained after 0.5 hr. at 180°–185° C. and 400–600 p.s.i.g.

*Example 39.*—Example 35 was repeated with 0.163 gram of 10% rhodium sulfide-on-carbon. Similar results were obtained after 0.5 hr. at 180°–185° C. and 400–600 p.s.i.g.

*Example 40.*—Example 35 was repeated using 0.325 gram of 5% ruthenium sulfide-on-carbon. Similar results were obtained after 0.75 hr. at 180°–185° C. and 400–600 p.s.i.g.

*Example 41.*—To a 170-ml. stainless steel Magne-Dash autoclave were added 21.4 grams (0.116 mole) N-phenyl-p-phenylenediamine, 34.9 grams (0.349 mole) methyl isobutyl ketone, and 1.30 grams of 5% rhodium sulfide-on-carbon. The autoclave was sealed, purged with nitrogen and then with hydrogen, and hydrogen added to a pressure of 20 p.s.i.g. The reaction mixture was heated with agitation to 180° C., at which point the total pressure was about 40 p.s.i.g. Hydrogen was added to maintain a total pressure of about 70–120 p.s.i.g. for 2.3 hrs. at 180° C., after which time gas absorption had stopped. Treatment as in example 35 resulted in 31.3 grams (100% yield) of a residue product, consisting of about 99% purity N-(1,3 - dimethylbutyl)-N'-phenyl-p-phenylenediamine (as determined by analyses as in Example 35).

*Example 42.*—To a 20-gallon stainless steel autoclave fitted with a baffle and a rotating Dispersimax agitator having a turbine impeller and a hollow shaft (with holes at the top and bottom to allow circulation of gas currents from the vapor phase into the liquid phase) were added 18.4 kilograms (100 moles) of N-phenyl-p-phenylenediamine, 30.0 kilograms (300 moles) of methyl isobutyl ketone and 280 grams of 5% rhodium sulfide-on-carbon. The autoclave was sealed, purged with nitrogen and then with hydrogen, and hydrogen added to a pressure of 450 p.s.i.g. The autoclave was heated with agitation for about 3 hrs. at 180° C. and 400–600 p.s.i.g. The vessel was cooled, depressurized, and the reaction product removed. The catalyst was removed by filtration. After topping the filtrate to a pot temperature of 180° C. at 15 mm. pressure, there were obtained 26 kilograms (97% yield) of N-(1,3-dimethylbutyl)-N'-phenyl-p-phenylenediamine as a residue product of about 98.5% purity (as indicated by a vapor phase chromatographic analysis).

*Example 43.*—To a 2-liter stainless steel Magne-Dash autoclave were added 221 grams (1.2 moles) of N-phenyl-p-phenylenediamine, 460 grams (3.6 moles) of 5-methylheptanone-3 (ethyl amyl ketone), and 8.0 grams of 5% rhodium sulfide-on-carbon. The autoclave was sealed, purged with nitrogen and then with hydrogen, and hydrogen added to a pressure of 400 p.s.i.g. The reaction mixture was heated with agitation at 180° C. and 400–600 p.s.i.g. for 1.8 hrs., at the end of which time gas absorption had stopped. The autoclave was cooled, depressurized, and the reaction product removed. The catalyst was removed by filtration, and the filtrate topped to a pot temperature of 180° C. at about 40 mm. pressure. The crude residue was shown by vapor phase chromatographic analysis to contain about 93% of the major component, N -3 - (5 - methylheptyl)-N'-phenyl-p-phenylenediamine. Distillation at 193°–195° C. at 2 mm. pressure gave this product having about 99% purity.

*Example 44.*—To a 600-ml. stainless steel Magne-Dash autoclave were added 31.6 grams (0.20 mole) 1,5-diaminonaphthalene, 158.5 grams (2.73 moles) acetone and 2.5 grams of 5% rhodium-on-carbon. The autoclave was sealed, purged with nitrogen, and then with hydrogen. Hydrogen sulfide was added to a pressure of 50 p.s.i.g., followed by the addition of hydrogen to a pressure of 1300 p.s.i.g. The reaction mixture was heated with agitation at 140° C. and 1200–1400 p.s.i.g. for 3 hrs. The autoclave was cooled and depressurized and the reaction product removed The reaction mixture was filtered to remove the catalyst, and the solvent (excess acetone) was removed by distillation. The solid residue, crude N,N′-diisopropyl-1,5-diaminonaphthalene, weighed 47 grams (97% yield) and melted at 114°–126° C. The melting point was 130°–132° C. after one recrystallization from acetone-water. Recrystallization from a mixture of benzene and hexane, followed by a recrystallization from hexane, gave white crystals, M.P. 134°–135° C. *Analysis.* — Calcd. for $C_{16}H_{22}N_2$: C, 79.29; H, 9.15; N, 11.56. Found: C, 80.07; H, 9.26; N, 11.31. The dihydrochloride, prepared by reaction with conc. hydrochloric acid in 95% ethanol, melted at 284° C. (dec.). *Analysis.*—Calcd. for $C_{16}H_{24}N_2Cl_2$: Cl, 22.49. Found: Cl, 21.82.

*Example 45*—To a 2-liter stainless steel Magne-Dash autoclave were added 94.9 grams (0.60 mole) 1,5-diaminonaphthalene, 700 ml. cyclohexanone (ca. 6.7 moles) and 5.0 grams of 5% rhodium sulfide-on-carbon. The autoclave was sealed, purged with nitrogen and then with hydrogen, and hydrogen added to a pressure of 900 p.s.i.g. The reaction mixture was heated with agitation at 125°–130° C. and 900–1100 p.s.i.g. for 3.5 hrs. The autoclave was cooled and depressurized and the reaction product removed. After filtering to remove the catalyst and topping to a pot temperature of 185° C. at 25 mm. pressure, there were obtained 197 grams (102% yield) of a crude residue melting at 159°–194° C. (mostly at 189°–194° C.). Several recrystallizations from a mixture of benzene and 2-propanol gave a white powder, M.P. 195°–196° C., which was N,N′-dicyclohexyl-1,5-diaminonaphthalene. *Analysis.*—Calcd. for $C_{22}H_{30}N_2$: C, 81.93; H, 9.38; N, 8.69. Found: C, 82.77; H, 9.54; N, 8.38.

*Example 46.*—To a 2-liter stainless steel Magne-Dash autoclave were added 94.9 grams (0.60 mole) 1,5-diaminonaphthalene, 700 ml. methyl ethyl ketone (ca. 7.8 moles) and 5.0 grams of 5% rhodium sulfide-on-carbon The autoclave was sealed, purged first with nitrogen and then with hydrogen, and hydrogen added to a pressure of 900 p.s.i.g. The reaction mixture was heated with agitation at 130° C. and 900–1100 p.s.i.g. for 2.25 hrs. The autoclave was cooled and depressurized and the reaction product removed. After filtering to remove the catalyst and topping to a pot temperature of 185° C. at 21 mm. pressure, there were obtained 161 grams (99% yield) of a crude residue melting at 78°–99° C. (mostly at 95°–99° C.). Several recrystallizations from hexane gave a pale yellow powder, M.P. 114–114.5° C., which was N,N′-di-sec.-butyl-1,5-diaminonaphthalene. *Analysis.* — Calcd. for $C_{18}H_{26}N_2$: C, 79.95; H, 9.69; N, 10.36. Found: C, 80.06; H, 9.65; N, 10.93

*Example 47.*—To a 2-liter stainless steel Magne-Dash autoclave were added 94.9 grams (0.60 mole) 1,5-diaminonaphthalene, 700 ml. methyl isobutyl ketone (ca. 5.6 moles) and 5.0 grams of 5% rhodium sulfide-on-carbon. The autoclave was sealed, purged first with nitrogen and then with hydrogen, and hydrogen added to a pressure of 900 p.s.i.g. The reaction mixture was heated with agitation at 130° C. and 800–1200 p.s.i.g. for 9 hrs. The autoclave was cooled and depressurized and the reaction product removed After filtering to remove the catalyst and topping to a pot temperature of 190° C. at 22 mm. pressure, there were obtained 188 grams (96% yield) of a semi-solid, crude residue. Several recrystallizations from methanol gave white needles, M.P. 104.5–105° C., which were N,N′-di-1,3-dimethylbutyl-1,5-diaminonaphthalene. *Analysis.*—Calcd. for $C_{22}H_{34}N_2$: C, 80.92; H, 10.50; N, 8.58. Found: C, 81.42; H, 10.73; N, 8.80.

*Example 48.*—A 600-ml. stainless steel Magne-Dash autoclave was charged with 49.5 grams (0.50 mole) cyclohexylamine, 49.0 grams (0.50 mole) cyclohexanone, 120 ml. of dioxane and 2.5 grams of 5% platinum sulfide-on-carbon. The autoclave was sealed, purged with nitrogen, then with hydrogen, and hydrogen added to a pressure of 1300 p.s.i.g. The reaction mixture was heated with agitation for 16 hrs. at 80° C. with the pressure falling from 1620 to 1040 p.s.i.g. The autoclave was cooled and depressurized. The reaction product was removed, filtered to remove the catalyst, and the filtrate distilled into several fractions which were shown by vapor phase chromatographic analysis to contain a total of 77 grams (85% yield) of dicyclohexylamine.

*Example 49.*—A 2-liter stainless steel Magne-Dash autoclave was charged with 93.1 grams (1.0 mole) of aniline, 106 grams (1.0 mole) of freshly distilled benzaldehyde, 590 ml. of benzene and 8.0 grams of 5% rhodium sulfide-on-carbon. The autoclave was sealed, purged with nitrogen, then with hydrogen, and hydrogen added to a pressure of 1300 p.s.i.g. The reaction mixture was heated with agitation for 2 hrs. at 70° C., with the pressure falling from 1400 to 1250 p.s.i.g. The autoclave was cooled and depressurized. The reaction product was removed, filtered to remove the catalyst, and the filtrate distilled. There were obtained 51 grams (28% yield) of crude N-phenylbenzylamine, distilling at 133°–160° C. (in the vapor phase) at 1.5 mm. pressure and up to a pot temperature of 225° C. (in the liquid phase), melting at 25°–30° C., and identified by its infrared spectrum. The melting point was raised to 35.5°–36° C. by washing with hexane, and there was no depression on a mixed melting point with authentic N-phenylbenzylamine.

*Example 50.*—To a 600 ml. stainless steel Magne-Dash autoclave were added 24.6 grams (0.20 mole) nitrobenzene, 166 grams (2.87 moles) acetone and 2.5 grams of 5% rhodium-on-carbon. The autoclave was sealed, purged with nitrogen and then with hydrogen. Hydrogen sulfide was added to a pressure of 50 p.s.i.g., followed by the addition of hydrogen to a pressure of 1300 p.s.i.g. The reaction mixture was heated with agitation at 140° C. and 1200–1400 p.s.i.g. for 0.5 hr. The autoclave was cooled and depressurized. The reaction product was removed, filtered to remove catalyst, and the filtrate topped to a pot temperature of 200° C. at atmospheric pressure. The residue product was shown by vapor phase chromatographic analysis to be N-isopropylaniline of more than 99% purity.

*Example 51.*—To a 600-ml. stainless steel Magne-Dash autoclave were added 42.8 grams (0.20 mole) p-nitrodiphenylamine, 150.5 grams (2.59 moles) acetone and 2.5 grams of 5% rhodium-on-carbon. After sealing the autoclave, purging and adding hydrogen sulfide and hydrogen as in Example 50, the reaction mixture was heated with agitation at 140° C. and 1200–1400 p.s.i.g. for 2 hrs. The reaction product was treated as in Example 50. After topping to a pot temperature of 210° C. at atmospheric pressure, there were obtained 44 grams (98% yield) of N-isopropyl-N′-phenyl-p-phenylenediamine as a residue product, melting point 71°–79° C. (mostly 74°–79° C.), and identified by its infrared spectrum.

*Example 52.*—A mixture of 49.7 grams (0.36 mole) p-nitroaniline, 155 grams (2.16 moles) methyl ethyl ketone and 2.5 grams of 5% rhodium-on-carbon was added to a 600-ml. stainless steel Magne-Dash Autoclave. After sealing the autoclave, purging and adding hydrogen sulfide and hydrogen as in Example 50, the reaction mixture was heated with agitation at 140° C. and 1200–1400 p.s.i.g. for 6 hrs. The reaction product was treated as in Example 50, and there was obtained a more than 95% yield of distilled N,N′-di-sec-butyl-p-phenylenediamine, boiling point 157°–159° C. at 7 mm. pressure, $n_D^{31}$ 1.5302; this product was identified and analyzed as more than 99% pure by vapor phase chromatography.

*Example 53.*—To a 600-ml. stainless steel Magne-Dash autoclave were added 27.6 grams (0.20 mole) p-nitroaniline, 29.6 grams (0.41 mole) methyl ethyl ketone, 170 ml. water, and 2.5 grams of 5% rhodium sulfide-on-carbon. The autoclave was sealed, purged first with nitrogen and then with hydrogen, and hydrogen added to a pressure of 1300 p.s.i.g. The autoclave was heated with agitation at 180° C. and 1200–1400 p.s.i.g. for 2.5 hrs., with little or no gas absorption in the last hour. The autoclave was cooled, depressurized, and the reaction mixture removed. The catalyst was removed by filtration and the lower aqueous phase separated from the upper organic layer of the filtrate. The organic phase then was topped to a pot temperature of 150° C. at 30 mm. pressure. Vapor phase chromatographic analysis of the residue indicated it was practically pure N,N'-di-sec-butyl-p-phenylenediamine.

*Example 54.*—A mixture of 23.9 grams (0.0984 mole) of N-nitroso-p-nitro-diphenylamine, 166 grams (2.87 moles) of acetone and 2.5 grams of platinum dioxide was added to a 600-ml. stainless steel Magne-Dash autoclave. After sealing the autoclave, purging and adding hydrogen sulfide and hydrogen as in Example 46, the reaction mixture was heated with agitation at 1200–1400 p.s.i.g. for 2 hrs. at 120° C., 0.4 hr. at 120°–180° C. and 1 hr. at 180° C. The reaction product was treated as in Example 50, and after topping to a pot temperature of 180° C. under reduced pressure, there were obtained 19 grams (86% yield) of N-isopropyl-N'-phenyl-p-phenylenediamine as a residue product, melting point 69°–78° C. (mostly 74°–77° C.), and identified by its infrared spectrum. (The acetone added at the site of the original nitro group rather than at the site of the original amino group.)

*Example 55.*—A 600-ml. stainless steel Magne-Dash autoclave was charged with 35.6 grams (0.40 mole) of 2-nitropropane, 27.9 grams (0.48 mole) of acetone, 180 ml. of benzene, and 2.5 grams of 5% rhodium sulfide-on-carbon. The autoclave was sealed, purged first with nitrogen and then with hydrogen, and hydrogen added to a pressure of 1300 p.s.i.g. The reaction mixture was heated with agitation at 95° C. and 1200–1400 p.s.i.g. for 4.3 hrs., at which time gas absorption had stopped after approximately the theoretical amount of gas had been taken up. The autoclave was cooled and depressurized, and the reaction mixture removed. The catalyst was filtered off and excess hydrogen chloride gas passed into the filtrate with cooling. The resulting white precipitate was filtered off, washed with benzene and then with hexane. After allowing the hexane to evaporate into the air, followed by drying over Drierite (CaSO₄) under reduced pressure, there were obtained 46 grams (84% yield) of diisopropylamine hydrochloride, M.P. 210.5°–213° C.; no depression on a mixed melting point with an authentic sample melting at 213.5°–215° C.

*Example 56.*—A mixture of 39.6 grams (0.20 mole) of N-nitrosodiphenylamine, 195 ml. isopropanol, 2.5 grams of 5% rhodium-on-carbon and 0.64 gram (0.02 mole) of sulfur was added to a 600-ml. stainless steel Magne-Dash autoclave. The autoclave was sealed, purged with nitrogen and then with hydrogen, and hydrogen added to a pressure of 1300 p.s.i.g. The reaction mixture was heated with agitation at 180° C. and 1750 to 1400 p.s.i.g. for 0.6 hr., when gas absorption stopped abruptly. The autoclave was cooled and depressurized, and the reaction mixture removed. The catalyst was removed by filtration and the solvent removed by distillation, leaving 31.5 grams (93% yield) of diphenylamine as a residue product, melting point 51°–53° C.; no depression was shown in a mixed melting point with an authentic sample of diphenylamine.

*Example 57.*—To a 600-ml. stainless steel Magne-Dash autoclave were added 15.8 grams (0.20 mole) of pyridine, 210 ml. of xylene and 2.5 grams of 5% rhodium-on-carbon. The vessel was sealed, purged with nitrogen and then with hydrogen. Hydrogen sulfide was added to a pressure of 50 p.s.i.g., followed by the addition of hydrogen to a pressure of 1100 p.s.i.g. The reaction mixture was heated with agitation at 290° C. and 1600–1800 p.s.i.g. for 6.4 hrs. The autoclave was cooled and depressurized and the reaction product removed. The catalyst was removed by filtration and the filtrate distilled up to a final vapor temperature of 142° C. at atmospheric pressure, leaving little residue. Vapor phase chromatographic analysis of the distillate showed piperidine to be the major product, and the absence of pyridine.

*Example 58.*—A 600-ml. stainless steel Magne-Dash autoclave was charged with 87.3 grams (0.40 mole) of phenyl disulfide, 145 ml. of xylene and 2.5 grams of 5% rhodium sulfide-on-carbon. The autoclave was sealed, purged with nitrogen, then with hydrogen, and hydrogen added to a pressure of 1300 p.s.i.g. The autoclave was heated with agitation at 130° C. and 1450 to 1070 p.s.i.g. for 2.3 hrs., at the end of which time the gas absorption stopped at about 104% of theory for hydrogenolysis to thiophenol. The autoclave was cooled, depressurized and the reaction product removed. The catalyst was removed by filtration and the filtrate separated into a portion distilled to a boiling point of 152° C. and a residue portion. Both fractions were analyzed by vapor phase chromatographic analysis and titration with alkali, and were thereby shown to contain a total of 83.4 grams (95% yield) of thiophenol; benzene was not detected.

*Example 59.*—A 600-ml. stainless steel Magne-Dash autoclave was charged with 74.5 grams (0.40 mole) of phenyl sulfide, 160 ml. of isopropanol and 2.5 grams of 5% rhodium-on-carbon. The autoclave was sealed, purged with nitrogen and then with hydrogen. Hydrogen sulfide was added to a pressure of 50 p.s.i.g., followed by the addition of hydrogen to a pressure of 1300 p.s.i.g. The autoclave was heated with agitation for 4 hrs. at 180° C. and 1880 p.s.i.g. without any gas absorption. The vessel was cooled, depressurized, and the reaction mixture removed. The catalyst was removed by filtration and the filtrate topped to a pot temperature of 200° C. at atmospheric pressure. Infrared analysis of the residue showed only phenyl sulfide, confirming the absence of reaction indicated by lack of gas absorption.

*Example 60.*—A 600-ml. stainless steel Magne-Dash autoclave was charged with 37.3 grams (0.20 mole) of phenyl sulfide, 195 ml. of xylene and 2.5 grams of 5% rhodium-on-carbon. The autoclave was sealed, purged with nitrogen and then with hydrogen. Hydrogen sulfide was added to a pressure of 50 p.s.i.g., followed by the addition of hydrogen to a pressure of 1200 p.s.i.g. The autoclave was heated with agitation at 290° C. and 1970 to 1800 p.s.i.g. for 4.8 hrs. The vessel was cooled, depressurized and the reaction mixture removed. After removal of the catalyst by filtration, the filtrate was separated into three fractions by distillation. Vapor phase chromatographic analysis of each fraction showed the absence of thiophenol; about 80% of the phenyl sulfide was unreacted and the remainder had been converted to benzene.

*Example 61.*—A 600-ml. stainless steel Magne-Dash autoclave was charged with 43.7 grams (0.20 mole) of phenyl sulfone, 190 ml. of xylene and 2.5 grams of 5% rhodium-on-carbon. The autoclave was sealed, purged with nitrogen and then with hydrogen, and hydrogen sulfide added to a pressure of 50 p.s.i.g., followed by the addition of hydrogen to a pressure of 800 p.s.i.g. The autoclave was heated with agitation to 285° C. Hydrogen was added to increase the pressure from 1340 to 1800 p.s.i.g., and the autoclave then was kept at 290° C. for 4 hrs. with the pressure staying at about 1840 p.s.i.g. and no sign of any reaction. The vessel was cooled, depressurized, and the reaction mixture removed. Removal of the catalyst by filtration and of the solvent by evaporation yielded unreacted starting material (as shown by a mixed melting point determination), confirming the lack of gas absorption.

*Example 62.*—The new N,N'-dialkyl - 1,5 - diaminonaphthalene compounds of Examples 44–47 were shown to act as stabilizers and anti-cracking agents in natural rubber cured for 45 min. at 292° F. The recipes for the rubber stocks were as shown in Formulation #1, except for the blank which contained no N,N'-dialkyl-1,5-diaminonaphthalene.

FORMULATION #1

| Ingredient: | Parts per hundred parts of rubber (PHR) |
|---|---|
| Natural rubber (smoked sheets) | 100.0 |
| Zinc oxide | 5.0 |
| Zinc laurate | 3.5 |
| ISAF black (intermediate super abrasion furnace carbon black) | 45.0 |
| Pine tar | 3.5 |
| N-cyclohexyl-2-benzothiazole-sulfenamide | 0.5 |
| Sulfur | 2.25 |
| N,N'-dialkyl-1,5-diamino-naphthalene | 2.5 |

(A) Table I gives, for the various stocks, (1) the percentage retention of tensile strength after aging in air for 48 hrs. at 212° F. and (2) the percentage retention of tensile strength after aging in oxygen at 300 p.s.i.g. for 96 hrs, at 70° C.

TABLE I.—RETENTION OF TENSILE STRENGTH OF CURED NATURAL RUBBER AFTER AGING

| Compound | Percent Retention of Tensile | |
|---|---|---|
| | 48 hrs. in air at 212° F. | 96 hrs. in O₂ at 70° C. |
| None (Blank) | 38 | 32 |
| N,N'-diisopropyl-1,5-diaminonaphthalene | 58 | 62 |
| N,N'-dicyclohexyl-1,5-diaminonaphthalene | 66 | 60 |
| N,N'-di-sec-butyl-1,5-diaminonaphthalene | 57 | 59 |
| N,N'-di-1,3-dimethylbutyl-1,5-diaminonaphthalene | 61 | 60 |

(B) Table II illustrates the anti-cracking activity of these compounds in outdoor static tests after the above-described cured stocks had been aged in air for seven days at 158° F. Specimens of the stocks were prepared according to Procedure B of ASTM D518–57T and subjected to outdoor exposure on a roof at an angle of 45 degrees facing south. The specimens were observed at appropriate intervals, and the time to the appearance of cracks corresponding to those having a rating number of 3 as defined in ASTM D1171–59 is recorded in Table II.

TABLE II.—ANTI-CRACKING ACTIVITY

| Compound: | Time required to crack to rating No. of 3 (days) |
|---|---|
| None (Blank) | 20 |
| N,N'-diisopropyl-1,5-diaminonaphthalene | 37 |
| N,N'-dicyclohexyl-1,5-diaminonaphthalene | 37 |
| N,N-di-sec-butyl-1,5-diaminonaphthalene | 37 |

*Example 63.*—The new N-3-(5-methylheptyl)-N'-phenyl-p-phenylenediamine compound of Example 43 was tested as a rubber antiozonant in the SBR tread stock described in Formulation #2. Test pieces were cured 30 minutes at 320° F., and some pieces were additionally aged 7 days at 158° F. in a circulating air oven.

FORMULATION #2

| Ingredient: | Parts per hundred of rubber (PHR) |
|---|---|
| Synpol 1500 (SBR) | 100.0 |
| Zinc oxide | 3.0 |
| HAF black (high abrasion furnace carbon black) | 50.0 |
| Stearic acid | 1.0 |
| Saturated polymerized petroleum hydrocarbon (Paraflux) | 6.0 |
| Mercaptobenzothiazole | 0.7 |
| Diphenylguanidine | 0.5 |
| Sulfur | 1.75 |
| Antiozonant test chemical | 2.0 |

(A) In a dynamic flexing test, molded stocks (½" x 6" x ¼", having a ⅛" radius circular groove across the center) were mounted outdoors facing south and flexed through a 78° angle at about 8.5 kilocycles per hour. Identical tests were carried out at Naugatuck, Connecticut and Los Angeles, California. Observations were made after appropriate intervals, and the number of kilocycles to the appearance of cracks corresponding to those having a rating number of 3 as defined in ASTM D1171–59 is recorded in Table III.

TABLE III.—DYNAMIC FLEXING TEST

| Compound | Kilocycles Required to Crack to a Rating No. of 3 | | | |
|---|---|---|---|---|
| | Naugatuck | | Los Angeles | |
| | Unaged | Aged | Unaged | Aged |
| N-3-(5-methylheptyl)-N'-phenyl-p-phenylenediamine | 18,060 | 7,666 | 3,709 | 3,709 |
| None (Blank) | 1,528 | 5,582 | 1,260 | 1,680 |

(B) In a static flexing test, specimens were prepared according to Procedure B of ASTM D518–57T, looped, and subjected to outdoor exposure on a roof at Naugatuck, Connecticut at an angle of 45 degrees facing south. Observations were made as above and recorded in Table IV as the time in days required to develop cracking corresponding to that having a rating number of 3.

TABLE IV.—STATIC FLEXING TEST

| Compound | Days Required to Crack to a Rating No. of 3 | |
|---|---|---|
| | Unaged | Aged |
| N-3-(5-methylheptyl)-N'-phenyl-p-phenylenediamine | 33 | 10 |
| None (Blank) | 5 | 2 |

Having thus described our invention, what we claim and desire to protect by Letters Patent is:

1. A hydrogenation process comprising reacting an organic compound containing at least one functional group which is a nitro group or an N-nitrosoamine group with hydrogen to form the corresponding amine in the presence of a catalyst comprising a sulfide of a platinum metal of Periods 5 or 6, Group VIII, of the Periodic Table.

2. A reductive alkylation process comprising reacting an organic compound containing at least one functional group which is an amine group or a nitro group with hydrogen and with an aliphatic or alkylaryl ketone or an aliphatic or aryl aldehyde to form the corresponding amine compound in the presence of a catalyst comprising a sulfide of a platinum metal of Periods 5 or 6, Group VIII of the Periodic Table.

3. The process of claim 2 wherein the reductive alkylation is performed in a batch process.

4. A reductive alkylation process which comprises reacting aminodiphenylamine or nitrodiphenylamine with an aliphatic or alkylaryl ketone or an aliphatic or aryl aldehyde to form the corresponding N-substituted-N'-phenyl-phenylenediamine compound in the presence of a catalyst comprising a sulfide of a platinum metal of Periods 5 or 6, Group VIII, of the Periodic Table.

5. A batch reductive alkylation process for preparing an N-alkyl-N'-phenyl-phenylenediamine which comprises reacting p-aminodiphenylamine with an aliphatic ketone in the presence of a catalyst comprising a sulfide of a platinum metal of Periods 5 or 6, Group VIII, of the Periodic Table.

6. The process of claim 5 wherein said aliphatic ketone is acetone, methyl ethyl ketone, methyl isobutyl ketone, or ethyl amyl ketone.

7. The process of claim 5 wherein said sulfide of a platinum metal is platinum sulfide.

8. A reductive alkylation process comprising reacting a diaminonaphthalene with an aliphatic ketone and hydrogen to form the corresponding alkylated amine in the presence of a catalyst comprising a sulfide of a platinum metal of the Periods 5 or 6, Group VIII, of the Periodic Table.

References Cited

UNITED STATES PATENTS

| 2,344,244 | 3/1944 | Freed et al. | 260—689 X |
| 2,402,626 | 6/1946 | Howk. | |
| 2,415,817 | 2/1947 | Gohr et al. | 260—580 |
| 2,734,808 | 2/1956 | Biswell | 260—577 X |
| 2,868,847 | 1/1959 | Boyers | 252—472 X |
| 2,964,480 | 12/1960 | Schwartz | 252—472 X |
| 2,969,394 | 1/1961 | Chenicek | 260—577 |
| 2,993,931 | 7/1961 | Patterson et al. | 260—580 X |
| 3,032,520 | 5/1962 | Shaw | 260—28.5 |
| 3,035,014 | 5/1962 | Popoff et al. | 260—577 X |
| 3,055,840 | 9/1962 | Koch | 260—293.2 X |
| 3,209,030 | 9/1965 | Bicek | 260—577 X |

OTHER REFERENCES

Beilsteins Handbuch, vol. 13, 2nd Supp., 4th ed., p. 85 (1929).

CHARLES B. PARKER, *Primary Examiner*.

NICHOLAS S. RIZZO, JOSEPH P. BRUST, *Examiners*.

ROBERT L. PRICE, ROBERT V. HINES,
*Assistant Examiners*.